United States Patent [19]

Badour et al.

[11] Patent Number: 5,755,392

[45] Date of Patent: *May 26, 1998

[54] TAPE CARTRIDGE WITH REDUCED TANGENTIAL DRIVE FORCE

[75] Inventors: Leonard C. Badour, San Diego; Robert F. Stebe, Vista; John L. Haller, La Jolla, all of Calif.

[73] Assignee: Gigatek Memory Systems, La Costa, Calif.

[ * ] Notice: The term of this patent shall not extend beyond the expiration date of Pat. No. 5.702.065.

[21] Appl. No.: 734,668

[22] Filed: Oct. 22, 1996

Related U.S. Application Data

[60] Division of Ser. No. 333,793, Nov. 3, 1994, Pat. No. 5,702,065, which is a continuation-in-part of Ser. No. 184, 598, Jan. 21, 1994, abandoned.

[51] Int. Cl.⁶ .......................... G11B 23/087; G11B 23/04
[52] U.S. Cl. .......................... 242/342; 242/342; 242/340; 242/345; 242/346.2
[58] Field of Search .......................... 242/342, 340, 242/345, 346.2, 341, 597.6, 599.2, 599.4, 615.2; 360/132, 96.3

[56] References Cited

U.S. PATENT DOCUMENTS 2,183,522  12/1939  Wittel et al. .......................... 242/345
5,289,988   3/1994  Madsen .......................... 242/342

FOREIGN PATENT DOCUMENTS

| 055150 | 11/1981 | European Pat. Off. . |
| 4-64953 | 2/1992 | Japan .......................... 242/346.2 |
| 2073470 | 12/1990 | United Kingdom . |
| US88-01872 | 6/1988 | WIPO . |

*Primary Examiner*—John Q. Nguyen
*Attorney, Agent, or Firm*—Brown, Martin, Haller & McClain, LLP

[57] ABSTRACT

A belt-driven tape cartridge has tape spools rotatably mounted in the cartridge, and a belt drive assembly for driving the tape back and forth between the spools. The drive assembly includes three roller supporting pins, a driving roller rotatably mounted on one of the pins and a pair of guide rollers rotatably mounted on the other pins, and an endless drive belt extending around the rollers to contact tape on each spool. The cartridge has an opening for entry of a drive roller to engage and drive the belt driving roller so as to move the drive belt and drive tape back and forth between the spools. The drive roller mounting pin has a recess extending over at least a portion of the pin facing the drive opening for reducing the bearing surface area between the pin and driving roller so as to reduce the tangential drive force needed to rotate the driving roller.

15 Claims, 3 Drawing Sheets

TAPE CARTRIDGE WITH REDUCED TANGENTIAL DRIVE FORCE

CROSS-REFERENCES TO RELATED APPLICATIONS

This is a divisional of application Ser. No. 08/333,793, filed Nov. 3, 1994, U.S. Pat. No. 5,702,065, which was a continuation-in-part of application Ser. No. 08/184,598, filed Jan. 21, 1994 (abandoned).

BACKGROUND OF THE INVENTION

The present invention relates generally to tape cartridges in which tape is driven between two rotatable hubs, and is particularly concerned with belt-driven tape devices in which a flexible elastic drive belt contacts the tape on each reel hub and the drive belt is moved in order to move the tape back and forth between the reels.

Computers which read and write data on magnetic tape require rapid acceleration and deceleration of the tape, along with relatively high and uniform tape tension in order to maintain proper tape-to-head contact. Without continuous, close tape-to-head contact, data reading and writing errors will occur. Magnetic data tape cartridges of the type widely used in computers are normally belt driven.

One typical belt-driven tape cartridge which has been widely used in this field is described in U.S. Pat. No. 3,692,255 of Van Behren. In this cartridge, an endless drive belt passes around a belt driving roller positioned between two tape reels or spools, extends between the reels and around two corner guide rollers so as to contact the tape on each reel hub. Rotation of the belt driving roller causes the belt to drive the tape reels to tension the tape and move the tape between the tape rollers and across read and write heads. A reversible drive motor drives a drive roller on the tape deck which is in contact with the tape driving roller when the cartridge is placed in its operative position in the tape deck or slot. Rotation of the drive roller applies a tangential drive force to the driving roller, which in turn moves the tape between the reels in the desired forward or reverse direction.

One long-standing problem in such belt-driven tape cartridges is that a relatively high tangential drive force must be applied to the belt driving roller in order to rotate the roller and move the tape, in view of the relatively high tape tension required to maintain proper contact with the tape heads. This high tape tension makes the driving roller difficult to move. As computers become more and more compact, manufacturers need to use smaller, lower power motors which may not be able to supply a sufficiently high tangential drive force to provide the necessary tape tension. Reduction in tangential drive force has, up to now, involved a corresponding and undesirable reduction in tape tension in order to allow the driving roller to turn. Manufacturers have long sought to design a belt-driven tape cartridge which requires a lower tangential drive force while maintaining optimum tape tension.

SUMMARY OF THE INVENTION

It is an object of the present invention to provide a new and improved belt-driven tape cartridge.

According to the present invention, a belt-driven tape cartridge is provided, which comprises a housing having a front wall with a drive opening, at least three roller supporting pins rigidly mounted in the housing, a first one of the roller supporting pins being located adjacent the drive opening, a belt driving roller rotatably mounted on the first pin for engagement with a tape drive extending through the drive opening, a pair of belt drive rollers rotatably mounted on the other two roller supporting pins, a pair of tape spools rotatably mounted in the housing, an endless drive belt extending around the driving roller and guide rollers to contact tape on each of the spools, and the first roller supporting pin having at least one recess extending at least over a portion of the pin facing the drive opening.

The recess may be confined to portions of the pin facing the drive opening, or may extend around the circumference of the pin. The recess may comprise an axially extending slot extending between opposite ends of the pin but terminating short of the ends of the pin, or may alternatively comprise a series of spaced, shorter slots extending lengthwise along the pin. The recess may comprise a generally rectangular or arcuate cut-out, or may be a flat cut in the cylindrical surface of the pin. The recess may be an annular recess, or more than one such recess.

The recess will reduce the bearing surface area between the pin and roller to less than that of a completely cylindrical pin and roller. The frictional torque between a cylindrical pin and roller is highest on the side facing the drive opening, where the drive force is applied by the drive roller, pushing the roller against the pin. By providing one or more recesses in the pin on the drive side of the pin only, resistance to turning the drive roller can be reduced significantly without needing to provide recesses extending around the entire pin circumference. By reducing the resistance to turning, the tangential drive force needed to drive the driving roller, and thus the tape, will also be reduced significantly. This allows a smaller, lower power motor to be used to drive the cassette.

The pin may be of metal or plastic material. The driving roller will generally be of plastic. In an alternative embodiment of the invention, rather than providing a recess on the pin, a recess may be provided in the central bore of the driving roller. In one embodiment, the diameter of the central bore of the driving roller may be made larger than that of the pin, and a pair of annular washers may be mounted in the central bore of the driving roller at opposite ends of the bore for engaging the pin. This also reduces the surface contact area between the pin and roller, since the pin is spaced from the roller except in the region of the washers. This version has the advantage of being relatively easy to manufacture.

The tape cartridge with reduced bearing surface area between the pin and driving roller, as compared to a smooth cylindrical opening in a driving roller extending over a smooth cylindrical pin, will reduce the tangential drive force necessary to rotate the driving roller and thus to move the tape, without any need for reduced tape tension. Thus, tape tension can be kept at an optimum level while still permitting smaller, lower power drive motors to be used in the tape deck. This arrangement may be used in any belt-driven tape cartridge in order to reduce the tangential drive force necessary to move the tape.

BRIEF DESCRIPTION OF THE DRAWINGS

The present invention will be better understood from the following detailed description of some preferred embodiments of the invention, taken in conjunction with the accompanying drawings, in which like reference numerals refer to like parts, and in which.

DESCRIPTION OF THE PREFERRED EMBODIMENTS

Figure 1:
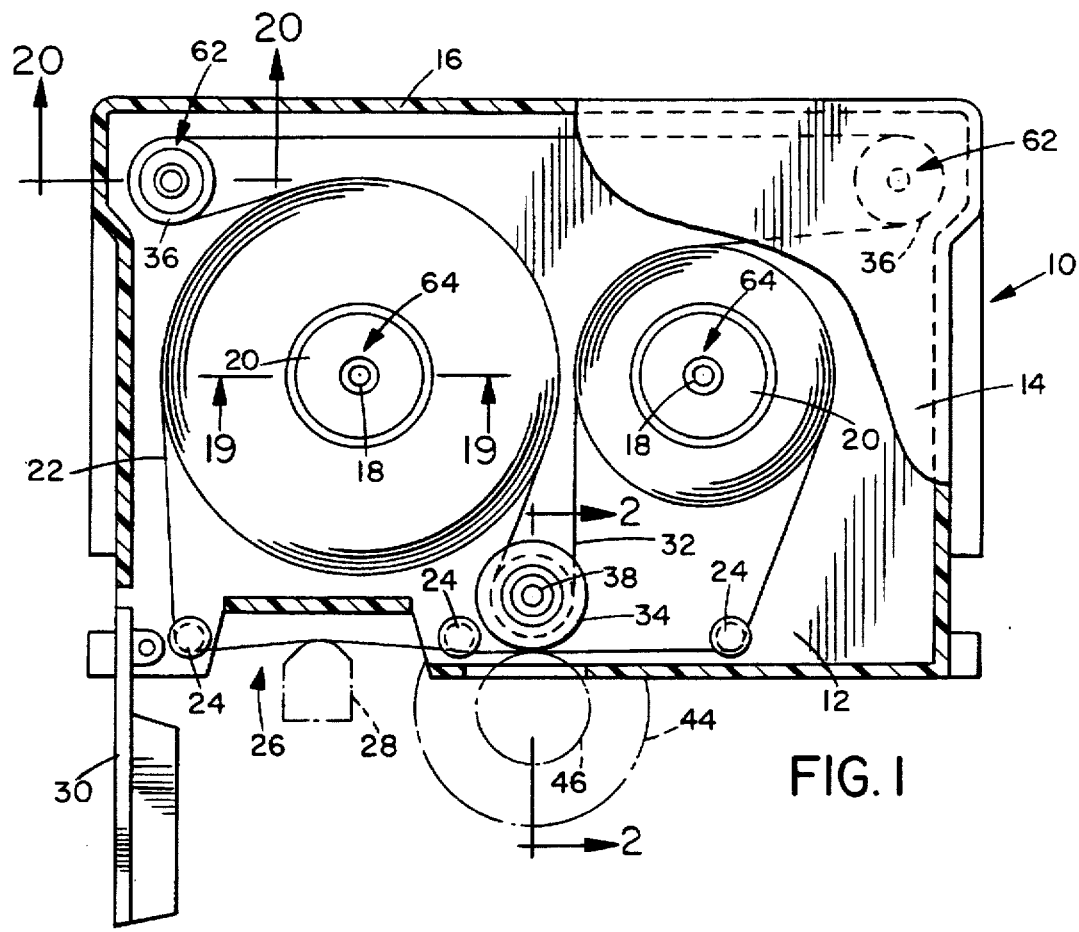
FIG. 1 is a top view of a belt-driven tape cartridge, partially cut away, incorporating a drive assembly according to a first embodiment of the present invention.

FIG. 1 illustrates a belt-driven magnetic data tape cartridge layout incorporating an improved belt drive assembly according to a preferred embodiment of the present invention. The cartridge 10 comprises a generally rectangular housing having a lower wall 12, upper wall 14 and peripheral walls 16. The housing holds various internal tape guiding and transporting components. A pair of hub or spool mounting pins 18 are mounted in the housing, normally in the lower wall 12, and magnetic tape hubs or spools 20 are rotatably mounted on the pins 18. Tape 22 is wound on the spools 20 and extends along a tape guide path between the spools across the front wall of the housing. The tape guide path extends around various tape guide and tension pins 24. A first window 26 in the front wall of the housing allows a tape read/write head 28 to contact the tape 22 when the tape is inserted into a tape deck. Window 26 is closed by hinged door 30 when the cartridge is not in use.

Tape is driven between the two spools 20 by means of a belt drive assembly comprising an endless, flexible drive belt 32 which extends around a belt driving roller 34, between the two tape spools 20, and around corner guide rollers 36 at each of the rear corners of the housing. Belt driving roller 34 is rotatably mounted on a first support pin 38 adjacent a drive window 40 in the front wall of the housing. Corner guide rollers 34 are rotatably mounted on similar support pins 42 rigidly mounted at the opposite rear corners of the housing.

A reversible drive motor 44 on the tape deck drives a drive roller 46 which will be in driving contact with belt driving roller 34 when the cartridge is installed in a tape deck in a play/record position. Thus, rotation of roller 34 will move the belt in the path illustrated in FIG. 1, in turn driving the tape 22 between the two tape spools 20 and across the read/write head or transducer 28.

Conventionally, the tape hubs 20 and rollers 34, 36 will all be of plastic material, while the various supporting pins 18, 38, 42 are metal. In known cartridges, each pin is of cylindrical shape and each hub and roller has a corresponding cylindrical central opening for fitting over the respective pin with sufficient free play to permit rotation relative to the pin. The opposing cylindrical surfaces of the central roller openings and the pins form a cylindrical bearing surface, although the surfaces will not be in contact around their entire circumference as the roller rotates.

A predetermined tangential drive force will be required to rotate the driving roller 34, and this force is known to be dependent on the tension in tape 22. Tape tension must be maintained relatively high in order to provide close tape-to-head contact and prevent or reduce read/write errors. This in turn involves a relatively high tangential drive force, and requires the motor to be relatively high power. Such motors do not always meet the compact size and low cost requirements of modern computer technology.

Figure 2:
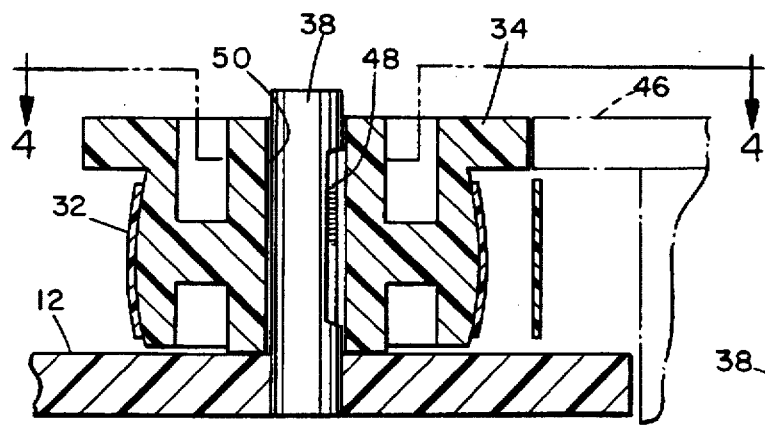
FIG. 2 is a cross-section on the lines 2—2 of FIG. 1.
Figure 3:
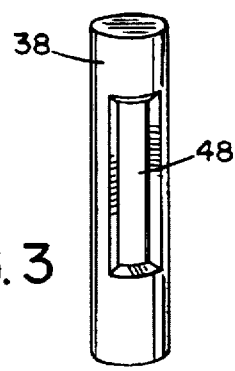
FIG. 3 is a perspective view of a support pin for supporting the driving roller of FIG. 2.

With the present invention, a way has been found to reduce the tangential drive force necessary to drive a tape at the required tape tension. This is done by reducing the surface area of contact between at least the driving roller 34 and driving roller support pin, by providing one or more recesses on one or both opposing surfaces. FIGS. 2 and 3 illustrate one embodiment of the invention.

In co-pending application Ser. No. 08/184,598 referred to above, various alternative embodiments for reducing the bearing surface area between a pin and roller were described. In each of these, one or more circumferentially extending grooves or recesses were provided on the outer surface of the mounting pin or the central opening of the roller. However, the frictional drag or resistance to turning the driving roller 34, at least, is not uniform around its periphery but will in fact be at a maximum at the point or portion contacting the drive roller 46, which applies pressure against the driving roller and pushes it more firmly against mounting pin 38 at this point.

The embodiment illustrated in FIGS. 2 and 3 takes advantage of this effect by providing an elongate, axially extending groove or recess 48 on the side of the mounting pin 38 facing the drive opening 40 through which the drive roller 46 will project when the cassette is inserted in a tape or cassette deck or player. There will tend to be a spacing between the cylindrical opening 50 in the drive roller and the mounting pin 38 on the opposite side of the mounting pin, due to the pressure applied by the drive roller 46 in the direction of arrow 52 in FIG. 4. Thus, extending recess 48 around the rear of pin 38 will not significantly reduce the tangential drive force, and the tangential drive force can in fact be effectively reduced by means of groove 48 on one side only of the mounting pin, as illustrated in FIGS. 2–4.

Figure 4:
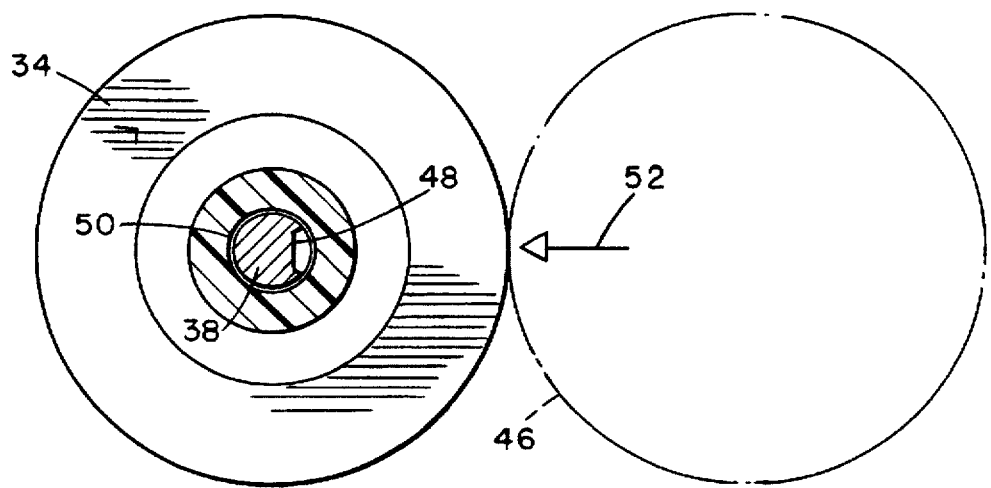
FIG. 4 is a sectional view on the lines 4—4 of FIG. 2.
Figure 5:
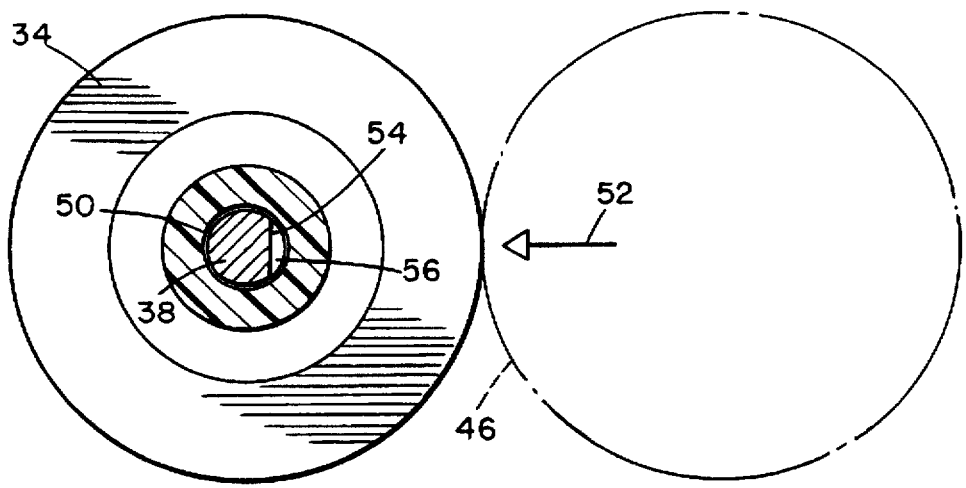
FIG. 5 is a sectional view similar to FIG. 4 illustrating a modified pin.
Figure 6:
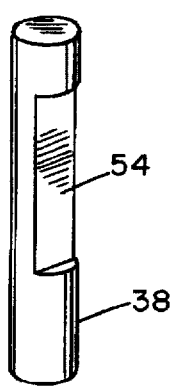
FIG. 6 is a perspective view of the alternative support pin of FIG. 5.

The groove or recess 48 may be of generally square or rectangular cross section, as illustrated in FIGS. 2–4. However, other recess shapes may be used in alternative embodiments. For example, as illustrated in FIGS. 5 and 6, a flat 54 may be machined on one side of pin 38 to form the recessed area or space 56 between the pin and the central opening 50 of the roller on the drive side of the pin. This may be easier to manufacture than a recess of the shape illustrated in FIGS. 2–4, and will produce the same reduction in the tangential drive force needed to move the belt for a given tape tension.

Figure 7:
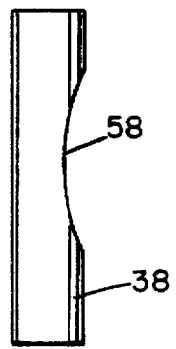
FIG. 7 is a side elevation view of another alternative support pin.

FIG. 7 illustrates another alternative in which a curved or arcuate recess 58 is formed on the side of the pin 38 facing drive opening 40.

Figure 8:
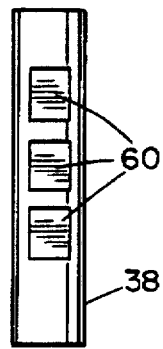
FIG. 8 is a side elevation view of another support pin.

Instead of providing a single, axially extending recess as in the previous embodiments, the mounting pin 38 may be provided with a series of spaced, axially extending recesses or indents 60, as illustrated in FIG. 8.

Figure 9:
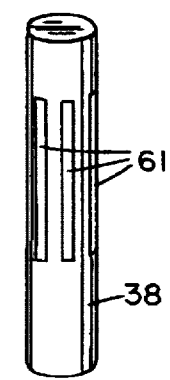
FIG. 9 is a perspective view of another alternative support pin.

FIG. 9 illustrates another alternative embodiment in which the pin 38 is provided with a series of spaced, parallel vertical slots 61 on the side facing the drive roller 46 and drive opening 40.

The circumferential width of the or each recess in the preceding four embodiments will be arranged such that the recess extends over the region where the pin and roller are pushed closer together by the drive roller 46. Thus, the contact area between the pin and drive roller is reduced substantially in that region where increased frictional drag between the surfaces is typically incurred, significantly reducing the frictional resistance to rotating roller 34.

The above embodiments are intended to be used on the driver roller mounting pin 38 of the cassette of FIG. 1. However, similar recesses may be provided on other pins in the drive assembly, depending on where the maximum frictional drag is encountered in the rollers mounted on those pins. Each guide roller 36 will encounter maximum resistance on the side facing drive belt 32, so the guide roller mounting pins 42 may be recessed in portions facing outwardly towards the drive belt 32, i.e. in regions 62. Similarly, the spool mounting pins 18 may be recessed on portions of those pins facing towards the portions of the drive belt extending around the spools on the respective pins, i.e. in regions 64. Alternatively, these pins and rollers may have recesses as described in any of the embodiments of pending application Ser. No. 08/184,598 referred to above, or may be conventional pins and rollers with no recesses.

Figure 10:
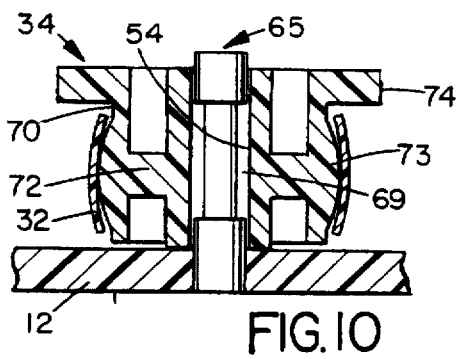
FIG. 10 is a cross-section similar to FIG. 2 illustrating another modified pin.
Figure 11:
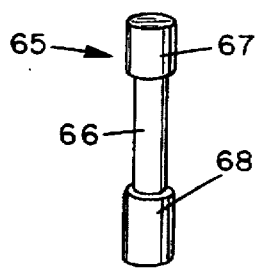
FIG. 11 is a side elevation view of the support pin of FIG. 10.

FIGS. 10 and 11 illustrate a modified driving roller support pin 65 in which an annular recess 66 extends around the entire pin circumference.

As illustrated in FIGS. 10 and 11, driving roller support pin recess 66 is located between bearing portions 67,68. Region 66 forms an annular recess or clearance 69 between the opposing cylindrical surface or central opening 50 in driving roller 34 and the surface of pin 65. The depth of recess 66 can be extremely small, for example of the order of 0.001 inches, although it may be deeper than this if desired, as long as the pin remains sufficiently rigid. The length of recess 66 may be between 0.04 and 0.3 inches for a pin of total length 0.5 inches. This reduces the effective bearing surface area (i.e. the portion of the pin over which the roller is engaged) of the pin by an amount between 10% and 80% of the cylindrical bearing surface area if no recess is provided. In the embodiment illustrated in FIG. 10, the driving roller 34 is of conventional shape having an outer annulus or ring 70 and an inner annulus or ring 71 which fits over pin 65, the rings being interconnected by radial web 72. The outer surface of ring 70 has an arcuate region 73 for contact with drive belt 32, and an upper rim portion 74 of enlarged diameter for engagement with the drive wheel 46, as best illustrated in FIG. 1.

In one preferred embodiment, a bearing surface area reduction of 40% was provided with an annular recess or region 66 of length 0.15 inches ±0.03. The consequent reduction in the plastic/metal bearing surface area between the roller 34 and pin 65 has been found to significantly reduce the tangential drive force necessary to drive the belt.

Figure 12:
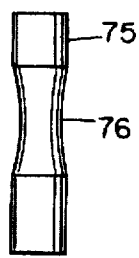
FIG. 12 is a side elevation view of another alternative support pin.
Figure 13:
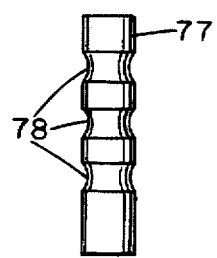
FIG. 13 is a side elevation view of another alternative support pin.
Figure 14:
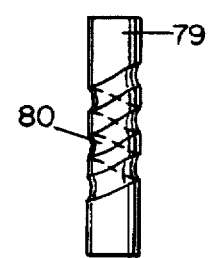
FIG. 14 is a side elevation view of another alternative support pin.

FIGS. 12–14 illustrate various other alternative embodiments for reducing the bearing surface area of the driving roller support pin, any of which may be used in place of support pin 38 of FIGS. 1–3.

FIGS. 12–14 illustrate various modified support pins in which the bearing surface area is reduced by providing a recess or recesses on the support pin. In FIG. 12, modified pin 75 is provided with an annular, curved recess 76 rather than a rectangular section recess as in FIGS. 10 and 11. In FIG. 13, rather than providing a single, long annular groove or recess, modified pin 77 has a plurality of annular grooves 78 which may be formed by a suitable groove cutting tool. In FIG. 14, modified pin 79 has a spiral groove 80 formed by a suitable thread cutting tool. It will be understood that a recess or recesses of various sizes and shapes may alternatively be formed on the driving roller support pin, as long as the overall result is a net reduction in bearing surface area of at least 10%.

Figure 15:
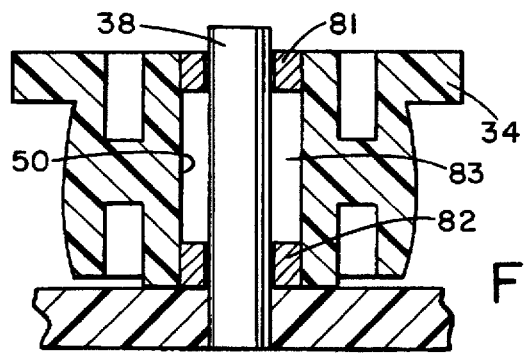
FIG. 15 is a cross-section similar to FIG. 2 illustrating a modified driving roller and support pin.

FIG. 15 illustrates another alternative embodiment of the invention. In this embodiment, instead of providing cut-outs or recesses on the mounting pin 38, annular washers 81,82 are mounted at the top and bottom, respectively, of the central opening 50 in roller 34. Thus, an annular spacing or gap 83 is formed between the opposing surfaces of the roller and pin between washers 82 and 82, and the bearing surface area is reduced to the contact area between washers 81,82 and pin 34. It will be understood that a similar arrangement may be provided on any of the other rollers or spools rotatably mounted on other pins in the cassette.

The washers 81,82 may be of brass or plastic and are suitably bonded or adhered to the central opening 50 in roller 34. Although the mounting pin 38 will normally be of metal, as are all the other mounting pins in the housing, it may alternatively be made of rigid plastic material, which may also act to reduce the tangential drive force necessary to rotate driving roller 34. The other mounting pins in the cassette housing may also be of plastic material.

Figure 16:
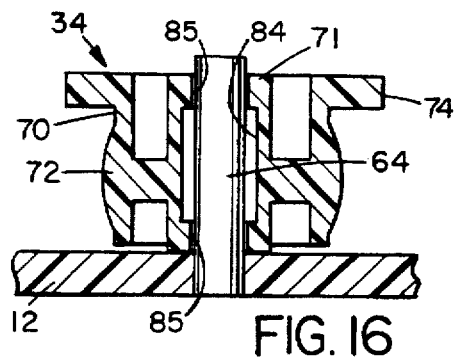
FIG. 16 is a cross-section similar to FIG. 15 illustrating another modified driving roller.

FIG. 16 illustrates another alternative in which a recess 84 is provided in the central opening 50 of driving roller 34, and the support pin 38 has a smooth cylindrical surface. Annular recess 84 may be formed, for example, by molding the driving roller 34 in two or more parts and then bonding the parts together. The depth of groove 84 is at least 0.001 inches, and a bearing height of at least 0.04 inches is provided at the top and bottom bearing portions 85.

Figure 17:
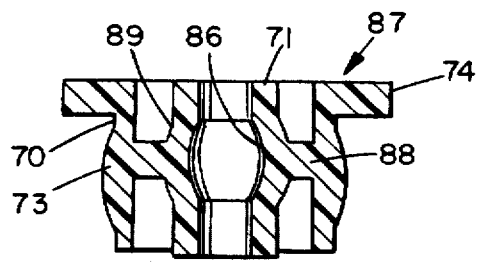
FIG. 17 is a sectional view of another modified driving roller.
Figure 18:
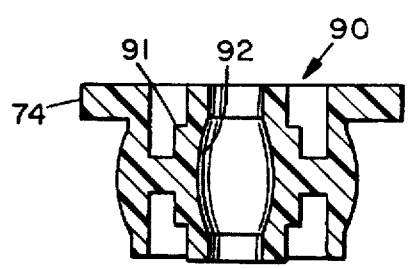
FIG. 18 is a sectional view of another modified driving roller.

FIGS. 17 and 18 illustrate alternative techniques for forming a recessed area on the inner surface of the central opening in a driving roller. These take advantage of the inherent property of plastic when molded to shrink and form dips in the thicker regions of the molded part, due to slower cooling in these regions as compared to surrounding thinner regions of the part. In a conventional driving roller 34 as illustrated in FIG. 3, a very small depression will generally form on the inner surface of opening 50 aligned with the web and thicker, rounded outer surface region. Normally, this is considered an undesirable effect and in the past manufacturers have attempted to avoid formation of such dips. However, in FIG. 17, this property is used to advantage to form a depression or dip 86 of increased size in modified driving roller 87, by increasing the thickness of web 88 connecting outer ring to inner ring, and providing a gusset or outwardly tapered region 89 where web 88 meets inner ring 71, increasing the plastic thickness in this region and thus extending the dip 86 to the desired dimensions for producing a significant reduction in bearing surface area, preferably at least 10%. It should be noted that dips inherently formed in conventional driving rollers in this region would reduce the bearing surface area much less than this, typically by an amount of the order of 5% or less, which has little or no effect on tangential drive force.

FIG. 18 illustrates another modified driving roller 90 in which the inner ring has an increased diameter portion 91 on its outer surface which terminates just short of the upper end of the roller. The increased material thickness of the inner ring along the portion 91 will result in an extended dip or depression 92. Although depression 92 will be quite shallow, it will provide sufficient clearance between the pin and roller to produce the desired reduction in bearing surface area.

It will be understood that the driving roller may alternatively be provided with more than one recess or depression on the surface of opening, or with recesses of different shapes than illustrated in FIGS. 16, 17 and 18.

Figure 19:
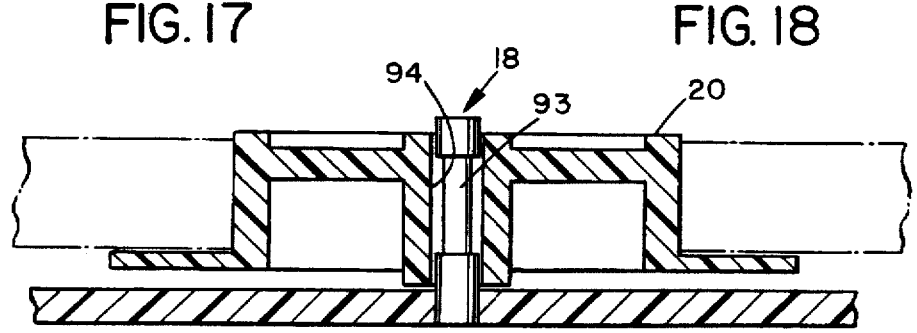
FIG. 19 is a cross-section on the lines 19—19 of FIG. 1 illustrating a modified tape hub supporting pin.
Figure 20:
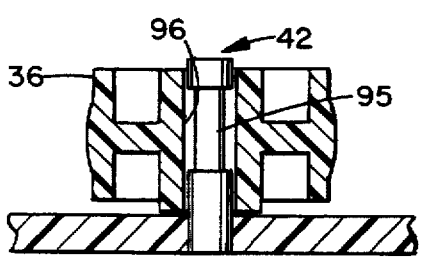
FIG. 20 is a cross-section on the lines 20—20 of FIG. 1 illustrating a modified pin for supporting a belt guide roller.

In order to further reduce the tangential drive force necessary to move the tape, reduced bearing surface areas may also be provided between some or all of the other pins and rollers in the cartridge, as illustrated in FIGS. 19 and 20. FIG. 19 illustrates a reduced bearing surface area between a tape hub 20 and tape hub support pin 18. In the illustrated embodiment, support pin 18 has a reduced diameter region 93 forming an annular clearance, as in the support pin 65 of FIGS. 10 and 11, while tape hub 30 has a conventional, cylindrical central opening 94. It will be understood that the desired clearance may also be provided in the hub, for example as illustrated in FIG. 16, 17 or 18, or may be provided in a different manner on pin 65, for example as illustrated in FIGS. 12, 13 or 14. With this arrangement, there will be less resistance to turning hubs 30 and thus less force required to drive tape 22 for the same tape tension.

The bearing surface area between corner rollers 36 and pins 42 may also be reduced in a similar manner, although these rollers are intended to produce a predetermined amount of drag and thus cannot be made to rotate too freely. However, the bearing surface area may be controlled in these rollers in order to control the amount of drag more precisely. As illustrated in FIG. 20, pin 42 may be provided with an annular recess 95, while roller 36 is of conventional shape with a cylindrical central opening 96. Any of the foregoing alternative techniques may selectively be used to reduce the bearing surface area at roller 36 and pin 42.

For twenty years or more, those skilled in the field have unsuccessfully sought to solve the problem of maintaining sufficiently high tape tension while driving the tape at a tangential drive force which is low enough to allow a compact, low power motor to be used. Up to now, high tape tension has required a correspondingly high tangential drive force. This problem has worsened with the introduction of increasingly more compact, inexpensive computers, so that allowing cassettes to be driven by more compact, less expensive and lower power motors has become an increasingly critical objective. In spite of this, up to now no effective solution has been found.

The present invention provides a simple and inexpensive technique for solving this problem. It has been found to be unexpectedly effective in greatly reducing the necessary tangential drive force for driving tape at the optimum tape tension. This will permit a more compact, low power motor to be used to drive the tape, further reducing the size and cost of the tape drive unit of computers and other similar devices.

By reducing the bearing surface area of contact between the driving roller and its mounting pin only, a significant reduction in tangential drive force may be obtained without also necessitating a reduction in tape tension to below acceptable limits. The bearing surface area may be reduced only on the side of the mounting pin facing the drive roller or drive opening in the cassette in order to produce the desired reduction in tangential drive force, since the roller will be biassed against the mounting pin more in this region. Similar bearing surface area reductions may be made between other mounting pins and rollers in the cassette to enhance the effect.

Although some preferred embodiments of the invention have been described above by way of example only, it will be understood by those skilled in the field that modifications may be made to the disclosed embodiments without departing from the scope of the invention, which is defined by the appended claims.

We claim:

1. A belt-driven tape cartridge, comprising:

an outer housing, the housing having a front wall with a drive opening for receiving an externally mounted drive roller of a tape drive;

first and second tape spools rotatably mounted in the housing;

a length of tape having a first end portion wound on the first tape spool and a second end portion wound on the second tape spool, whereby rotation of the tape spools in opposite directions transfers tape back and forth between the spools;

at least three roller supporting pins rigidly mounted in the housing comprising a first roller supporting pin located adjacent said drive opening and two guide roller supporting pins;

a belt driving roller rotatably mounted on said first roller supporting pin, said driving roller having a circumferential driving surface facing said drive opening for contact with a drive roller extending through said opening to rotate said driving roller;

belt guide rollers respectively mounted on the guide roller supporting pins;

an endless drive belt extending around said driving roller and guide rollers to contact said tape portions wound on each of the tape spools;

said first roller supporting pin having a cylindrical outer surface with at least one recess extending around the circumference of said first roller supporting pin, said recess comprising means for reducing the bearing surface area between said driving roller and first roller supporting pin, whereby the tangential drive force required to rotate said driving roller is reduced.

2. The cartridge as claimed in claim 1, wherein the first roller supporting pin has a plurality of recesses.

3. The cartridge as claimed in claim 1, wherein the first roller supporting pin has a series of spaced, annular grooves.

4. The cartridge as claimed in claim 1, wherein the first roller supporting pin has a helical groove extending along its length.

5. The cartridge as claimed in claim 1, including at least five roller supporting pins rigidly mounted in the housing, said pins comprising said first driving roller supporting pin, said guide roller supporting pins, and a pair of spaced tape spool supporting pins, each tape spool being rotatably mounted on a respective one of said tape spool supporting pins, said belt guide rollers and tape spools each having a central cylindrical opening for rotatable engagement over the respective supporting pin, each central cylindrical opening and respective supporting pin having opposing cylindrical bearing surfaces, each of said guide roller and tape spool supporting pins having at least one recess for reducing the bearing surface area between the central opening and pin by a predetermined amount.

6. The cartridge as claimed in claim 1, wherein the dimensions of the recess are sufficient to reduce the cylindrical bearing surface area in the range from 10% to 80%.

7. The cartridge as claimed in claim 6, wherein the bearing surface area is reduced in the range from 20% to 70%.

8. The cartridge as claimed in claim 1, wherein the recess has a depth of at least 0.001 inches.

9. The cartridge as claimed in claim 1, wherein the recess has a length in an axial direction of between 10% to 50% of the total axial length of the first roller supporting pin.

10. The cartridge as claimed in claim 9, wherein the recess has a length of 0.05 to 0.30 inches.

11. The cartridge as claimed in claim 10, wherein the recess has a length of 0.12 to 0.18 inches.

12. The cartridge as claimed in claim 1, wherein the first roller supporting pin has an annular recess having an arcuate cross-sectional shape.

13. A method for reducing the tangential drive force required to drive a tape in a belt-driven tape cartridge, comprising the steps of:

forming at least one recess in an outer cylindrical surface of a driving roller supporting pin to extend around the circumferential surface of said pin;

providing a driving roller with a central opening for rotatable engagement over said driving roller supporting pin and an outer circumferential driving surface;

assembling the driving roller and supporting pin in a tape cartridge with a drive belt extending around the driving roller to contact tape on tape spools also assembled in the cartridge, the driving roller facing a drive opening of said cartridge;

extending a drive member of a tape drive through the drive opening to contact the circumferential driving surface of said driving roller; and actuating the drive member to rotate the driving roller on the supporting pin and drive tape back and forth between the tape spools;

the recess being of predetermined dimensions sufficient to substantially reduce the tangential drive force needed to rotate the driving roller to drive tape at a predetermined tension between the spools.

14. A tape transport assembly, comprising:

a tape cartridge housing having a front wall with a drive opening;

first and second tape spools rotatably mounted in the housing;

a length of tape having a first end portion wound on the first tape spool and a second end portion wound on the second tape spool, whereby rotation of the tape spools in opposite directions transfers tape back and forth between the spools;

at least three roller supporting pins rigidly mounted in the housing, including a first roller supporting pin located adjacent said drive opening;

a belt driving roller rotatably mounted on said first roller supporting pin, said driving roller having a circumferential driving surface facing said drive opening;

belt guide rollers respectively mounted on the other two roller supporting pins;

an endless drive belt extending around said driving roller and guide rollers to contact said tape portions wound on each of the tape spools;

a drive roller for extending through said drive opening and engaging said circumferential driving surface to rotate said driving roller and drive tape back and forth between the spools; and said first roller supporting pin having a cylindrical outer surface with at least one recess extending around the circumference of said first roller supporting pin, said recess comprising means for reducing the bearing surface area between said driving roller and first roller supporting pin, whereby the tangential drive force required to rotate said driving roller is reduced.

15. The assembly as claimed in claim 14, wherein only the first roller supporting pin is provided with a recess and none of the other roller supporting pins have recesses.

* * * * *